United States Patent Office / 3,647,809 / Patented Mar. 7, 1972

3,647,809
CERTAIN PYRIDYL-1,2,4-OXADIAZOLE
DERIVATIVES
Kalman Harsanyi Jozsef Reiter, Dezso Korbonits, Csaba Gonczi, Kalman Takacs, Erzsebet Bako, Gyorgy Leszkovszky, Laszlo Tardos, and Csaba Vertesy, Budapest, Hungary, assignors to Chinoin Gyogyszer-es Vegyeszeti Termekek Gyara Rt., Budapest, Hungary
No Drawing. Filed Apr. 8, 1969, Ser. No. 815,520
Claims priority, application Hungary, Apr. 26, 1968, CI–796
Int. Cl. C07d 31/42
U.S. Cl. 260—296 R       4 Claims

ABSTRACT OF THE DISCLOSURE

A 1,2,4-oxadiazole for use as a pharmaceutically active agent with spasmolytic, antipyretic, analgesic, hypnotic or antirheumatic properties. The compound is of the formula

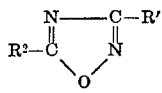

wherein $R^1$ consists of 2-pyridyl, 3-pyridyl or 4-pyridyl unsubstituted or substituted with an alkyl group having 1 to 6 carbon atoms, and wherein $R^2$ is phenyl, halophenyl aminophenyl, hydroxyphenyl or chlorophenoxymethyl. The application also discloses the hydrochloride, hydrobromide, sulfate, phosphate, maleate, lactate, acetate or tartarate acid-addition salt of the 1,2,4-oxadiazole and its alkylhalogenide-quaternized or alkylsulfate-quaternized pharmaceutically acceptable salt wherein the alkyl group of the quaternizing compound contains 1 to 6 carbon atoms.

---

The invention relates to new 1,2,4-oxadiazole derivatives, a process for the preparation thereof and pharmaceutical compositions containing same. More particularly it is concerned with new 1,2,4-oxadiazoles, substituted in at least one of the positions 3 and 5 by a pyridyl radical. The compounds according to the present invention possess valuable therapeutical properties.

Several 1,2,4-oxadiazole derivatives are pharmaceutically useful known compounds exhibiting e.g. antitussive, spasmolytic, local anaesthetic and coronary dilatory effect (see our British Patent 1,053,825). Hitherto there have not been known however 1,2,4-oxadiazole derivatives which exert a significant effect on the muscle tone.

According to a feature of the present invention there are provided new compounds of the general Formula I

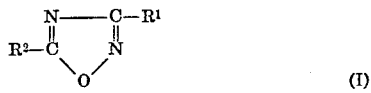

(wherein $R^1$ and $R^2$ stand for an optionally substituted pyridyl, alkyl, aralkyl or aryl radical with the proviso that at least one of said symbols $R^1$ and $R^2$ stands for an optionally substituted pyridyl radical) and salts and quaternary salts thereof.

The compounds of the Formula I, and salts thereof may be used in therapy particularly as spasmolytic and muscle relaxant agents.

The term "alkyl radical" relates to straight or branched chained saturated aliphatic hydrocarbon radicals containing preferably 1–6 carbon atoms (e.g. methyl, ethyl, isopropyl etc.). The term "aryl radical" relates particularly to the phenyl and naphthyl radicals. The "aralkyl radicals" are alkyl groups substituted with one or more aryl radicals (e.g. benzyl, β-phenyl-ethyl etc.).

The above radicals may bear optionally one or more substituents. The pyridyl radical may be preferably substituted with alkyl groups (e.g. methyl or ethyl). When $R^1$ and/or $R^2$ stand for alkyl, they may be substituted preferably by one or more of the following radicals: amino, alkylamino, dialkylamino or a heterocyclic radical (e.g. a monocyclic nitrogen-containing heterocyclic radical such as pyridyl), optionally substituted aryl radical (e.g. chloro-phenyl) or optionally substituted aryloxy radical (e.g. chloro-phenoxy), hydroxy or alkoxy group.

If $R^1$ and/or $R^2$ represent an aryl or aralkyl group, the aryl radical thereof may be optionally substituted by substituents selected from the group consisting of amino, alkylamino, dialkylamino, halogen, hydroxy, alkoxy and β-styryl.

The term "alkoxy group" as used in the present specification relates to straight or branched chained alkoxy groups containing preferably 1–6 carbon atoms (such as methoxy, ethoxy). The term "amino group" encompasses primary, secondary, tertiary and cyclic amino groups (e.g. monoalkylamino, dialkylamino, piperidyl, morpholinyl etc.). The salts of the compounds of the Formula I are acid-addition salts formed with inorganic or organic acids. Particularly suitable salts are e.g. the hydrochlorides, hydrobromides, sulphates, phosphates, maleates, lactates, acetates, tartarates, etc. The quaternary salts are formed with quaternizing agents preferably with alkyl halogenides or sulphates containing 1–6 carbon atoms.

Particularly valuable representatives of the compounds according to the present invention are the following derivatives:

3-(4-pyridyl)-5-(2-chloro-phenyl)-1,2,4-oxadiazole,
3-(2-pyridyl)-5-(2-chloro-phenyl)-1,2,4-oxadiazole,
3-(2-chloro-phenyl)-5-(4-pyridyl)-1,2,4-oxadiazole,
3-(4-pyridyl)-5-(3-chloro-phenyl)-1,2,4-oxadiazole,
3-(4-pyridyl)-5-(4-chloro-phenyl)-1,2,4-oxadiazole,
3-(2-ethoxy-phenyl)-5-(3-pyridyl)-1,2,4-oxadiazole
3-styryl-5-(4-pyridyl)-1,2,4-oxadiazole,
3-(3-pyridyl)-5-(2-chloro-phenyl)-1,2,4-oxadiazole,
3-(3-pyridyl)-5-(4-amino-phenyl)-1,2,4-oxadiazole,
3-(3-pyridyl)-5-(piperidino-methyl)-1,2,4-oxadiazole,
3-(3-pyridyl)-5-(2-pyrrolidine-ethyl)-1,2,4-oxadiazole,
3-(2-pyridyl)-5-(2-piperidino-ethyl)-1,2,4-oxadiazole,
3-(2-pyridyl)-5-(2-morpholino-ethyl)-1,2,4-oxadiazole,
3-(3-pyridyl)-5-(4-chloro-phenoxy-methyl)-1,2,4-oxadiazole
3-(4-pyridyl)-5-methyl-1,2,4-oxadiazole,
3-(4-pyridyl)-5-(3-pyridyl)-1,2,4-oxadiazole,
3-(4-pyridyl)-5-(4-pyridyl)-1,2,4-oxadiazole,
3-(4-pyridyl)-5-(2-piperidino-ethyl)-1,2,4-oxadiazole,
3-(4-pyridyl)-5-(2-morpholino-ethyl)-1,2,4-oxadiazole,
3-(2-ethyl-4-pyridyl)-5-methyl-1,2,4-oxadiazole,
3-(2-ethyl-4-pyridyl)-5-(2-chloro-phenyl)-1,2,4-oxadiazole, 3-(2-ethyl-4-pyridyl)-5-(2-pyridyl)-1,2,4-oxadiazole,
3-(2-ethyl-4-pyridyl)-5-(2-hydroxyphenyl)-1,2,4-oxadiazole,
3-(2-ethyl-4-pyridyl)-5-(4-pyridyl)-1,2,4-oxadiazole,
3-(2-ethyl-4-pyridyl)-5-(2-ethyl-4-pyridyl)1,2,4-oxadiazole,
3-(2-ethyl-4-pyridyl)-5-(4-chloro-phenyl-methyl)-1,2,4-oxadiazole,
3-(4-pyridyl)-5-(4-chloro-phenoxy-methyl)-1,2,4-oxadiazole,
3-(2-ethyl-4-pyridyl)-5-(2-piperidino-ethyl)-1,2,4-oxadiazole, and acid addition salts and quaternary salts thereof.

The most valuable compounds of the Formula I are the following derivatives:

3-(4-pyridyl)-5-(2-chloro-phenyl)-1,2,4-oxadiazole,
3-(2-pyridyl)-5-(2-chloro-phenyl)-1,2,4-oxadiazole,
3-(2-chloro-phenyl)-5-(4-pyridyl)-1,2,4-oxadiazole and salts and quaternary salts thereof.

According to a further feature of the present invention there is provided a process for the preparation of compounds of the Formula I which comprises (a) Reacting amidoximes of the general Formula II

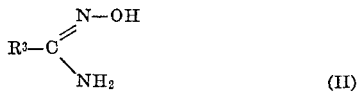

(II)

(wherein $R^3$ stands for $R^1$ or a radical which may be converted into $R^1$) with acids of the general Formula III

(III)

(wherein $R^4$ stands for $R^2$ or a radical which may be converted into $R^2$) or acid derivatives thereof and if necessary subjecting the intermediate product thus obtained to pyrolysis or splitting off water or alcohol from said intermediate product; or (b) Reacting amidoximes of the general Formula II (wherein $R^3$ has the same meaning as stated above) with aldehydes of the general Formula IV

(IV)

(wherein $R^4$ has the same meaning as stated above) or with derivatives thereof capable of condensation and oxidizing the oxadiazoline compounds thus formed; or (c) Subjecting compounds of the general Formula V

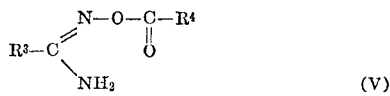

(V)

(wherein $R^3$ and $R^4$ have the same meanings as stated above) to ring closure.

If necessary the radical $R^3$ is converted into radical $R^1$ and the radical $R^4$ is converted into radical $R^2$ and if desired the compounds of the Formula I, thus obtained into their salts or quaternary salts.

According to method (a) of our process amidoximes of the Formula II are reacted with acids of the Formula III or reactive derivatives thereof. As reactive acid derivatives capable of acylation preferably esters, acid anhydrides or acid halogenides may be used. One may proceed preferably by carrying out acylation by means of acid halogenides, particularly acid chlorides. The reaction may be carried out advantageously in the presence of acid binding agents e.g. alkali metal carbonates (such as sodium carbonate), alkaline earth metal carbonates (e.g. calcium carbonate), organic bases etc. One may also proceed by using the amidoxime in excess whereby it serves both as reactant and acid binding agent. The reaction may be accomplished preferably in the presence of an inert solvent (e.g. hydrocarbons, such as benzene tor toluene; ethers, acetone, dimethylformamide, halogenated hydrocarbons etc.).

If acylation is carried out with acid halogenides, the O-acylated amidoximes are formed as intermediates. The compounds of the Formula V are subjected to ring closure. The cyclization may be accomplished by different methods. One may proceed by subjecting the O-acyl derivatives to pyrolysis. The reaction may be carried out by thermal decomposition. The compounds of the Formula V may be converted into the compounds of the Formula I also by heating same in a solvent (preferably in the presence of a dehydrating agent or by removing water by means of azeotropic distillation). As sol particularly pyridine and glacial acetic acid may be used. The ring-closure may be also carried out by heating the compounds of the Formula V with aqueous acids or bases.

As acid derivatives capable of acylation the esters of the compounds of the Formula III may also be used. The interaction between the amidoximes of the Formula II and the esters of the acids of the Formula III is carried out in the presence of alkali alcoholates or alkaline earth alcoholates, particularly sodium methylate, potassium methylate, sodium ethylate, potassium ethylate, sodium isobutylate, etc. The reaction may be carried out advantageously in alcoholic medium and particularly in the presence of the alcohol corresponding to the alcoholate used. The reaction may be accomplished preferably at a temperature in the range of 50–120° C. One may proceed preferably by using the alcoholate in an amount of 0.1–2.0 moles, particularly 1 mole calculated on the amidoxime component.

As reactive derivatives of the acids of the Formula III the acid anhydrides may also be used. One may also proceed by carrying out the acylation of the amidoxime of the Formula II with the free acids of the Formula III.

According to method (b) of our process amidoximes of the Formula II are reacted with aldehydes of the Formula IV or derivatives thereof capable of condensation. It is preferable to use the acetals as reactive aldehyde derivatives. The reaction may be carried out at room temperature. The interaction may be accelerated or made complete by the application of heat. The reaction may be carried out in the presence of a solvent or without same. The oxadiazoline derivatives of the Formula VI

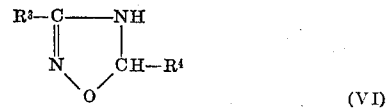

(VI)

thus formed may be converted into the 1,2,4-oxadiazoles of the Formula I by means of oxidation. The oxidation may be effected by using the oxygen of air or other oxidizing systems such as potassium permanganate.

According to method (c) of our process compounds of the Formula V are subjected to ring closure. The cyclisation may be carried out in several ways. One may proceed by heating the O-acyl-derivative of the Formula V with a water-binding agent in the presence of an organic solvent. As organic solvent it is preferable to use pyridine or glacial acetic acid. The water formed by the reaction may also be continuously removed by means of azeotropic distillation.

The cyclization may also be effected by heating the compound of the Formula V with aqueous acids or bases. One may also proceed by using thermal ring closure.

The substituents $R^1$ and $R^2$ may be either already present in the starting materials (in the compound of the Formulae II, III and IV) or may be formed subsequently in the O-acyl-derivatives of the Formula V or after ring closure. The chemical reactions by which the groups $R^3$ and $R^4$ are transformed into the radicals $R^1$ and $R^2$ respecively are known per se and depend on the nature of the initial radicals $R^3$ and $R^4$ and on the desired radicals $R^1$ and $R^2$.

As examples of the transformation of the radicals $R^3$ and $R^4$ into the groups $R^1$ and $R^2$ respectively the following methods are mentioned:

A halogen substituent of the phenyl-ring may be formed by diazotizing an amino group and subjecting the diazonium compound to the Sandmeyer reaction. The hydroxy group may also be formed from the amino group by diazotizing the corresponding amino compound and allowing the diazonium compound to warm up to a temperature above 5° C. The aromatic amino group may be formed by reducing the corresponding nitro derivatives. An amino group attached to an alkyl chain may be formed preferably by replacing a halogeno or sulphonic acid ester group by an amino group. The amino group may be formed by subjecting the corresponding carbonyl compound and the amine to reductive condensation. The ethers may be prepared alkylating the corresponding hydroxy compounds.

The compounds of the Formula I may be transformed into their acid addition salts or quaternary ammonium salts. For the formation of the acid addition salts inorganic acids (such as hydrochloric acid, hydrobromic acid, sulphuric acid, phosphoric acid) and organic acids (such as maleic acid, lactic acid, tartaric acid, acetic acid etc.) may be used.

The salt formation may be carried out by methods known per se, advantageously by reacting the compound of the Formula I in the presence of an organic solvent with an approximately equivalent amount of the corresponding acid.

According to a further feature of the present invention there are provided pharmaceutical compositions comprising as active ingredient at least one compound of the Formula I (wherein $R^1$ and $R^2$ have the same meaning as stated above) or an acid addition salt or quaternary ammonium salt thereof in admixture with suitable inert pharmaceutical carriers and/or excipients. The composition according to the present invention may be used in therapy, particularly as muscle relaxants and spasmolytics. The 3-(4-pyridyl) - 5 - (2-chloro-phenyl)-1,2,4-oxadiazole—a compound of the Formula I—e.g. inhibits the spasms caused by electroshock, strychnine and nicotine. The strychnine-spasm-inhibiting activity of the compound in rats and mice is 4 to 6 times higher than that of Chlorzoxazone, while the nicotine-antagonist activity thereof surpasses that of Trihexylphenidyl 3–4 times in mice. At the same time Chlorzoxazone does not inhibit nicotine-toxicity and Trihexylphenidyl does not inhibit spasm induced by strychnine. The 3-(4-pyridyl)-5-(2-chloro-phenyl)—1,2,4-oxadiazole inhibits the polysynaptical reflexes of spinal marrow and reduces the muscular strength of mice. In higher doses it inhibits specifically the morphine-induced hypermotility in mice; Chlorzoxazone does not exhibit such an effect.

A further advantage of the compounds of the Formula I resides in their extremely low toxicity both in acute and chronical tests.

The pharmaceutical compositions according to the present invention may be made as a solid (e.g. tablets, coated pills, suppositories, capsules) or as a liquid (e.g. solutions, emulsions, suspensions, injectable preparations) forms. The compositions may be prepared according to methods of pharmaceutical industry known per se by admixing a compound of the Formula I or a salt thereof with suitable inert organic or inorganic solid or liquid carriers and/or excipients. As a carrier one may use e.g. talc, magnesium-stearate, starch, calcium carbonate, water, polyalkylene glycols etc. The compositions according to the present invention may contain if desired further additives, such as emulsifiers, stabilizing agents, wetting agents, filling agents, etc. The compositions may also contain in addition to the compound of the Formula I further known therapeutically useful compounds.

Further details of our invention are to be found in the examples. It is however by no means intended to limit the scope of our invention to the examples.

EXAMPLE 1

A mixture of 13.7 g. (0.1 mole) of isonicotinic acid amidoxime, 36.8 g. (0.2 mole) of o-chloro-ethyl-benzoate and 60 ml. of anhydrous ethanol is heated to boiling for half an hour, whereupon a sodium-ethylate solution prepared of 2.3 g. (0.1 mole) of sodium and 40 ml. of anhydrous ethanol is added to the hot ethanolous suspension. The reaction mixture is boiled for 8 hours, whereby 50 ml. of ethanol are distilled off and 50 ml. of water are added. The reaction-mixture is heated again to boiling, clarified with 1.2 g. of activated charcoal and filtered. On cooling the filtrate a precipitate appears which is separated by filtration. Thus 21.3 g. of 3-(4-pyridyl) - 5 - (2 - chloro - phenyl) - 1,2,4 - oxadiazole are obtained. Yield 83%. M.P.: 107–111° C. The product may be crystallized from 96% ethanol, M.P.: 111° C.

Analysis.—Calc. (percent): C, 60.56; H, 3.13; N, 16.30; Cl, 13.76. Found (percent): C, 60.51; H, 3.24; N, 16.69; Cl, 13.43.

The toxicity of the product amounts to $DL_{50}=2050$ mg./kg. in mice and $DL_{50}=5000$ mg./kg. in rats in acute test, when administered orally. The toxicity has been observed after 48 hours. If administered to young rats in a daily dose of 250 mg./kg. for 3 months the animals tolerated the compound well.

The product inhibits the electroshock-induced spasms in mice and rats. ($ED_{50}=17.5$ [12.5–24.5] mg./kg. in rats and $ED_{50}=15.4$ [16.6–22.4] mg./kg. in mice when administered orally). The product also inhibits the styrchnine-induced spasms ($ED_{50}=96$ [66.2–134.5] mg./kg. in rats and $ED_{50}=96$ [81–125] mg./kg. in mice when administered orally) and it also inhibits the nicotine-toxicity in mice. ($ED_{50}=30$ [20–45] mg./kg. when administered orally.)

The product decreases the muscular strength of mice by 25% when administered in a dose of 100 mg./kg. and by 35% when administered in a dose of 200 mg./kg. The test was carried out according to the method of Fleury. The product inhibits the spontaneous motility of mice when administered in a dose of 100 mg./kg. In a dose of 200 mg./kg. it reduces the morphine-induced irritability (excitement) and hypermotility in a significant extent, while in the same dose it does not decrease the effect of other stimulants, such as phenmetrazine, cocaine, etc. In cats under chloralose-urethane anaesthesia the product inhibits the polysynaptical crossed extensor reflex. The product causes a reflex-response-decrease of 81.6% when administered in a dose of 5 mg./kg. intravenously and that of 93.1% when administered in a dose of 10 mg./kg. intravenously. This effect elapses in about 20–25 minutes. If administered in a dose of 10–20 mg./kg. intravenously it does not influence the monosynaptical patella-reflex.

EXAMPLE 2

13.7 g. (0.1 mole) of isonicotinic acid-amidoxime are suspended in 25 ml. of dry pyridine, whereupon 17.15 g. (0.1 mole) of o-chloro-benzoyl-chloride are added dropwise within 15 minutes without cooling. The temperature of the reaction-mixture rises to 40–45° C. The reaction-mixture is refluxed for an hour. The pyridine is distilled off under reduced pressure, to the residue 50 ml. water are added and it is thoroughly mixed. The suspension is filtered by suction and washed with water. Thus after drying 21.0 g. of 3-(4-pyridyl)-5-(2-chloro-phenyl)-1,2,4-oxadiazole are obtained. Yield 82%. M.P.: 95–99° C. After recrystallization from 96% ethanol the melting point rises to 111° C.

EXAMPLE 3

2.74 g. (0.02 mole) of isonicotinic acid-amidoxime 12 g. (0.02 mole) of o-chloro-benzoic acid-anhydride and 20 ml. of anhydrous benzene are refluxed for 3 hours. The solvent is distilled off and the residue is stirred with a 4% aqueous sodium-hydroxide solution for an hour. The precipitated crystalline 3-(4-pyridyl)-5-(2-chloro-phenyl)-1,2,4-oxadiazole is filtered by suction. The melting point of the product is 111° C. after recrystallization from ethanol.

EXAMPLE 4

13.7 g. (0.1 mole) of isonicotinic acid-amidoxime are dissolved in 55 ml. 2 N aqueous sodium-hydroxide solution, whereupon 19.25 g. (0.1 mole) of o-chloro-benzoyl-chloride are added dropwise below 10° C. under cooling. The precipitated product is filtered off and dried under an infrared lamp. After recrystallization from methylene-chloride 22 g. of isonicotic acid-amidoxime-o-chloro-benzoate are obtained. M.P.: 144–146° C.

*Analysis.*—Calc. (percent): C, 56.63; H, 3.66; Cl, 12.85. Found (percent): C, 56.67; H, 3.80; Cl, 13.27.

The isonicotinic acid-amidoxime-o-chloro-benzoate thus obtained is heated at 130° C. for an hour whereby the water formed in the reaction is distilled off and bound with phosphorous pentoxide. The melting point of the residual crude 3-(4-pyridyl)-5-(2 - chloro-phenyl)-1,2,4-oxadiazole amounts to 102–105° C. After recrystallization from 96% ethanol the melting point rises to 111° C.

EXAMPLE 5

13.8 g. (0.1 mole) of picolic acid-amidoxime and 36.9 g. (0.2 mole) of o-chloro-benzoic acid-ethylester are boiled in 300 ml. of anhydrous ethanol, whereupon a sodium-ethylate solution prepared of 2.3 g. of sodium and 60 ml. of anhydrous enthanol is added. The reaction mixture is refluxed for 8 hours, whereupon the ethanol is distilled off and the residue is warmed with a solution of 4.1 g. of sodium-hydroxide and 60 ml. of water on a water-bath for an hour. The aqueous suspension is cooled, extracted with chloroform and the solvent is distilled off. Thus 21 g. of 3 - (2 - pyridyl)-5-(2-chloro-phenyl)-1,2,4-oxadiazole are obtained. Yield: 81.5%. M.P. 93–95° C. The product may be crystallized from anhydrous ethanol.

*Analysis.*—Calc. (percent): C, 60.56; H, 3.13; N, 16.30. Found (percent): C, 60.8; H, 3.48; N, 16.19.

The product inhibits the strychnine-induced spasms [$ED_{50}$=25.0 (14.7–42.5) mg./kg. is administered orally], the nicotine toxicity [$ED_{50}$=52.0 (34.4–78.6) mg./kg. when administered orally] and the electroshock induced spasms in mice.

EXAMPLE 6

8.53 g. of o-chloro-benzoic acid-amidoxime are dissolved in 40 ml. of cold pyridine whereupon 8.95 g. of isonicotinic acid-chloride hydrochloride are added under stirring and external aqueous cooling in small portions. After completing the addition the reaction-mixture is stirred at room-temperature for 30 minutes whereupon it is refluxed for 3 hours. The reaction-mixture is allowed to stand in a refrigerator overnight, the precipitated crystals are filtered by suction and washed thoroughly with water. Thus 10.25 g. of 3-(2-chloro-phenyl)-5-(4-pyridyl)-1,2,4-oxadiazole are obtained. Yield: 80%, M.P.: 133–137° C. After crystallization from aqueous ethanol the melting point rises to 138–140° C.

*Analysis.*—Calc. (percent): C, 60.56; H, 3.13. Found (percent): C, 60.17; H, 3.03.

The product inhibits the strychnine-induced spasm [$ED_{50}$=56.0 (32.8–95.6) mg./kg. when administered orally] and the nicotine-toxicity and electroshock induced spasms in mice.

EXAMPLE 7

To a solution of 2.58 g. of 3-(4-pyridyl)-5-(2-chloro-phenyl) - 1,2,4 - oxadiazole and 10 ml. of warm benzene 5 g. of methyl iodide are added and the reaction-mixture is heated to boiling for 30 minutes. The precipitated crystals are filtered by suction and washed successively with a small amount of anhydrous ethanol and ether. The 3 - (4 - pyridyl)-5-(2-chloro-phenyl)-1,2,4-oxadiazole-iodomethylate is obtained in nearly theoretical yields. M.P.: 247° C. After crystallization from 80% ethanol the melting point remains unchanged.

*Analysis.*—Calc. (percent): Cl, 8.87; I, 31.75. Found (percent): Cl, 8.76; I, 31.52.

EXAMPLE 8

(a) 2.58 g. of 3-(2-chloro-phenyl)-5-(4-pyridyl)-1,2,4-oxadiazole are dissolved in 15 ml. of methanol whereupon 5 g. of methyl iodide are added. The reaction-mixture is heated to boiling for 30 minutes whereafter it is cooled and filtered by suction. Thus 3.0 g. of 3-(2-chloro-phenyl)-5 - (4 - pyridyl) - 1,2,4-oxadiazole-iodomethylate are obtained. M.P.: 231–232° C.

The product may be crystallized from 80% aqueous ethanol.

*Analysis.*—Calc. (percent): N, 10.51; Cl, 8.87. Found (percent): N, 10.22; Cl, 8.91.

(b) 2.74 g. of isonicotinic acid-amidoxime and 2.8 g. of o-chloro-benzaldehyde are heated cautiously over an infrared lamp until a melt is formed. The melt is heated further until bubbling is observed which indicates the removal of water. Heating is continued until the evolution of gas ceases. The resinous product is dissolved in 96% ethanol whereupon water is added and the precipitated product is filtered by suction. The crude product is crystallized from ethanol. The melting point of the 3-(4-pyridyl)-5-(2 - chloro-phenyl) - 1,2,4 - oxadiazole amounts to 109–110° C.

EXAMPLES 9–32

These compounds are prepared according to the methods described in Examples 1–6, particularly according to Example 5. The starting materials used and the melting-point and the analysis of the end-products obtained are summarized in the following table.

Example 33

Tablets having the following composition are prepared by methods known per se

| | Mg. |
|---|---|
| 3-(4-pyridyl)-5-(2-chloro-phenyl)-1,2,4-oxadiazole | 250 |
| Starch | 42.5 |
| Talc | 7.5 |
| Total weight | 300.0 |

What we claim is:

1. A 1,2,4-oxadiazole of the formula

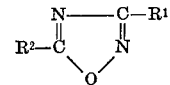

wherein $R^1$ consists of 2-pyridyl, 3-pyridyl or 4-pyridyl unsubstituted or substituted with an alkyl group having 1 to 6 carbon atoms, and wherein $R^2$ is phenyl, halophenyl, aminophenyl, hydroxyphenyl or chlorophenoxy-methyl; or a hydrochloride, hydrobromide, sulfate, phosphate, maleate, lactate, acetate or tartarate acid-addition salt of said 1,2,4-oxadiazole.

2. 3-(4-pyridyl)-5-(2-chlorophenyl)-1,2,4-oxadiazole.

3. The 1,2,4-oxadiazole defined in claim 1 and consisting of 3-(4-pyridyl)-5-(2-chloro-phenyl)-1,2,4-oxadiazole, or 3-(2-pyridyl)-5-(2-chloro-phenyl)-1,2,4-oxadiazole.

4. A 1,2,4-oxadiazole selected from the group consisting of 3-(4-pyridyl)-5-(2-chloro-phenyl)-1,2,4-oxadiazole,
3-(2-pyridyl)-5-(2-chloro-phenyl)-1,2,4-oxadiazole,
3-(2-chloro-phenyl)-5-(4-pyridyl)-1,2,4-oxadiazole,
3-(4-pyridyl)-5-(3-chloro-phenyl)-1,2,4-oxadiazole,
3-(4-pyridyl)-5-(4-chloro-phenyl)-1,2,4-oxadiazole,
3-(2-ethoxy-phenyl)-5-(3-pyridyl)-1,2,4-oxadiazole,
3-(3-pyridyl)-5-(2-chloro-phenyl)-1,2,4-oxadiazole,
3-(3-pyridyl)-5-(4-amino-phenyl)-1,2,4-oxadiazole,
3-(3-pyridyl)-5-(4-chloro-phenoxy-methyl)-1,2,4-oxadizaole,
3-(4-pyridyl)-5-methyl-1,2,4-oxadiazole,
3-(4-pyridyl)-5-(3-pyridyl)-1,2,4-oxadiazole,
3-(4-pyridyl)-5-(4-pyridyl)-1,2,4-oxadiazole,
3-(2-ethyl-4-pyridyl)-5-methyl-1,2,4-oxadiazole,
3-(2-ethyl-4-pyridyl)-5-(2-chloro-phenyl)-1,2,4-oxadiazole,
3-(2-ethyl-4-pyridyl)-5-(2-pyridyl)-1,2,4-oxadiazole,
3-(2-ethyl-4-pyridyl)-5-(2-hydroxyphenyl)-1,2,4-oxadiazole,
3-(2-ethyl-4-pyridyl)-5-(4-pyridyl)-1,2,4-oxadiazole,
3-(2-ethyl-4-pyridyl)-5-(2-ethyl-4-pyridyl)-1,2,4-oxadiazole,
3-(2-ethyl-4-pyridyl)-5-(4-chloro-phenyl-methyl)-1,2,4-oxadiazole,
3-(4-pyridyl)-5-(4-chloro-phenoxy-methyl)-1,2,4-oxadiazole,
3-(4-pyridyl)-5-(3-chloro-phenoxy-methyl)-1,2,4-oxadiazole, and acid addition salts and quaternary salts thereof.

References Cited

UNITED STATES PATENTS 3,265,692   8/1966   Harsanyi et al. ........ 260—296

OTHER REFERENCES

Burger: Medicinal Chemistry, Second Edition, Interscience, p. 497, 1960.

ALAN L. ROTMAN, Primary Examiner

U.S. Cl. X.R.

260—247.1, 247.2 R, 247.5 R, 294 S, 294.7 D, 294.8 R, 295 S, 240 D; 424—248, 263, 266, 267